(12) United States Patent
Marcum

(10) Patent No.: US 6,314,337 B1
(45) Date of Patent: Nov. 6, 2001

(54) AUTOMATED CONSOLIDATION STATION

(75) Inventor: Lorne Marcum, Round Rock, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/141,241

(22) Filed: Aug. 27, 1998

(51) Int. Cl.[7] .................................................. G06F 7/00
(52) U.S. Cl. ........................ 700/216; 700/225; 198/358
(58) Field of Search .................... 700/213, 225, 700/226, 227, 215, 216, 222; 198/418.1, 418.2, 418.3, 486.2, 358

(56) References Cited

U.S. PATENT DOCUMENTS

| | | |
|---|---|---|
| 4,542,808 * | 9/1985 | Lloyd, Jr. et al. ........................ 186/56 |
| 5,062,525 | 11/1991 | Terracol et al. ................... 198/468.6 |
| 5,528,878 | 6/1996 | Edwards et al. . |
| 5,593,269 | 1/1997 | Bernard, II . |
| 5,672,039 | 9/1997 | Perry et al. . |
| 5,675,962 | 10/1997 | Martin et al. . |
| 5,733,098 * | 3/1998 | Lyon et al. ............................. 414/786 |
| 6,141,602 * | 10/2000 | Igarashi et al. ....................... 700/226 |

FOREIGN PATENT DOCUMENTS

| | | |
|---|---|---|
| 0 340 639 A1 | 4/1989 | (EP) . |
| 2 232 283 A | 12/1990 | (GB) . |

* cited by examiner

*Primary Examiner*—Christopher P. Ellis
*Assistant Examiner*—Khoi H. Tran
(74) *Attorney, Agent, or Firm*—Haynes and Boone, L.L.P.

(57) ABSTRACT

An automated consolidation station for the assembly of computer systems includes a first conveyor and a second conveyor. A first code reader reads a label on a chassis on the first conveyor. A second code reader reads a label on a tote carrying computer components on the second conveyor. A first signal generated by the first reader is compared with a second signal generated from the second reader to determine if the signals are matched. A device receives an output when the signals are matched and another device senses the position of the tote and the chassis. The output energizes a system to position the chassis and the tote adjacent each other on a single one of the conveyors.

20 Claims, 4 Drawing Sheets

AUTOMATED CONSOLIDATION STATION

BACKGROUND

The disclosures herein relate generally to computer systems and more particularly to an automated pick and place device used on an assembly line in the custom manufacture of computer systems.

This application relates to co-pending U.S. patent application Ser. No. 09/053,524, filed on Mar. 31, 1998, entitled Manufacturing System and Method For Assembly of Computer Systems In a Build-To-Order Environment, naming Lois Goss as inventor. The co-pending application is incorporated herein by reference in its entirety, and is assigned to the assignee of this invention.

There have been many processes developed for consolidating assembly line stations including enhanced automation, tracking and inspection. For example, as disclosed in U.S. Pat. No. 5,528,878, an automated apparatus for controlling the automatic packaging of contact lenses in a contact lens fabrication facility includes: a first robotic transfer device for periodically transferring a first predetermined amount of individual packages from an inspection station to an intermediate consolidation buffer and depositing the packages on the consolidation buffer; a control device for tracking and identifying each individual contact lens conveyed from the inspection station to the consolidation buffer and including memory and logic circuits for storing the identity of individual packages containing contact lenses that have been previously determined at the inspection station as being out of specification, and, generating a signal to enable the first robotic device to discard any individual package identified as out of specification; and, a second robotic assembly for periodically transferring a second predetermined amount of individual packages from the consolidation buffer to a second processing station, the control device enabling the first robotic device to provide a sufficient amount of individual packages to the consolidation buffer to enable the second robotic assembly to continuously transfer the second predetermined amount of packages to the second processing station in every period.

In U.S. Pat. No. 5,593,269, an automated work center for use in materials handling operations is disclosed. The work center includes a randomly accessible vertically moving temporary storage queue for receiving containers that hold material goods. A fixed loading ramp is arranged to receive containers from an external system and to load the received containers onto the storage queue. A work area having a plurality of rotatable work tables provides and gives the operator access to the containers. A delivery system transfers containers between the storage queue and the work tables and a takeaway system transfers containers between the work area and the conveyor network. An automated control system coordinates the delivery of containers between the temporary storage queue and the work area. A consolidation queue having a multiplicity of vertically spaced shelves may be disposed opposite the work tables to facilitate the consolidation of ordered goods.

In U.S. Pat. No. 5,672,039 an apparatus and method for consolidation of warehoused goods into orders, sets or kits is described. The apparatus allows precise positioning of a large number of objects supported by a movable rigid member, without requiring precise drive motion. The method allows concurrent transfer of a large number of articles, to fill the same or different ones of a large number of orders, where items for different orders may be initially stored in the same or different storage containers.

In U.S. Pat. No. 5,675,962, an apparatus is provided for removing and transporting articles, such as contact lens sections from a manufacturing line to inspection and packaging stations. The lenses are deposited in a transparent plastic primary package which carries the lenses through the inspection station and becomes part of the primary package when a cover is sealed thereto. The invention includes various assemblies, including lens transfer assemblies deionized water filling and removal assemblies, a water degassing assembly, a lens inspection assembly, and a lens package sealing assembly. The lenses are removed from pallets at a post hydration station, transported and spatially redistributed, and deposited in the primary packages disposed on a second set of pallets. The packages on the second set of pallets are filled with degassed deionized water. The contact lenses and packages are then transported to an inspection station. After inspection, the lenses and packages are transported to a water removal assembly, and then to another transfer assembly. This transfer assembly separates those lenses which passed inspection from those which did not, and places those that did in a consolidating assembly. The lenses and packages are then filled with saline solution and a foil label is then sealed thereto to form the primary package.

In the assembly of computer systems, two parallel conveyors are used to move corresponding parts of the system to a consolidation station where the two conveyors are reduced to one conveyor. One of the conveyors moves a computer chassis including a power supply and a motherboard, and the other of the conveyors moves a tote which carries components which are to be later assembled into the chassis to complete the hardware assembly. Components manually placed in the tote include for example, floppy drives, hard drives, cables, a modem, and all other hardware required to complete building a respective build-to-order computer system.

The chassis is identified by a bar code label which identifies the system during its lifetime. As the chassis and an empty tote pass a scanner, a label matching the chassis label is created and placed on the tote. In this way, the chassis and tote are matched as they move along the parallel conveyors, so that the correct components are automatically identified and placed in the tote for eventual assembly in the chassis. The chassis and tote reach a point where the tote contains all of the required components for the associated chassis and the parallel conveyors terminate. The labels are read by an operator handheld scanner and an indicated match results in consolidation of the chassis and tote on a single conveyor which transports them to an assembly area. Consolidation is accomplished such that when the indicated match occurs, it is visually readable on a screen. The operator depresses a foot pedal which raises the system. The operator then picks up the chassis and places it on top of the tote to consolidate the matched tote and chassis for transport to the assembly area.

The consolidation process requires an operator at each consolidation position to operate the scanner and to physically stack the chassis on the tote. When this is multiplied by several assembly lines, the total number of operators and thus the total assembly cost escalates. In addition, the repeated reading, matching, lifting and stacking is tiresome work.

Therefore, what is needed is a system for automatically scanning and matching the parallel chassis and tote units, and automatically stacking the chassis onto the tote for transport to the assembly area.

SUMMARY

One embodiment, accordingly, provides an automated consolidation station which verifies a match between the chassis and the tote, moves the chassis to a position adjacent the tote on a single conveyor line, and forwards the chassis and tote to an assembly area. To this end, an automated consolidation station includes a first conveyor for conveying a chassis including a first label. A second conveyor conveys a tote including a second label matched to the first label. A pair of bar code readers are positioned such that one reader reads the chassis label and the other reader reads the tote label. A decoder receives a signal from each reader and compares the signals. A gripper is energized by an output produced by a match indicated by each signal being compared, for positioning the chassis and the tote on a single one of the conveyors.

A principal advantage of this embodiment is that it reduces the headcount on each assembly line by one operator. Therefore, in an operation having several assembly lines working simultaneously, for two shifts, the total savings is substantial. In addition, operator boredom and fatigue is eliminated for the reduced headcount positions.

DETAILED DESCRIPTION OF THE PREFERRED EMBODIMENT

Figure 1:
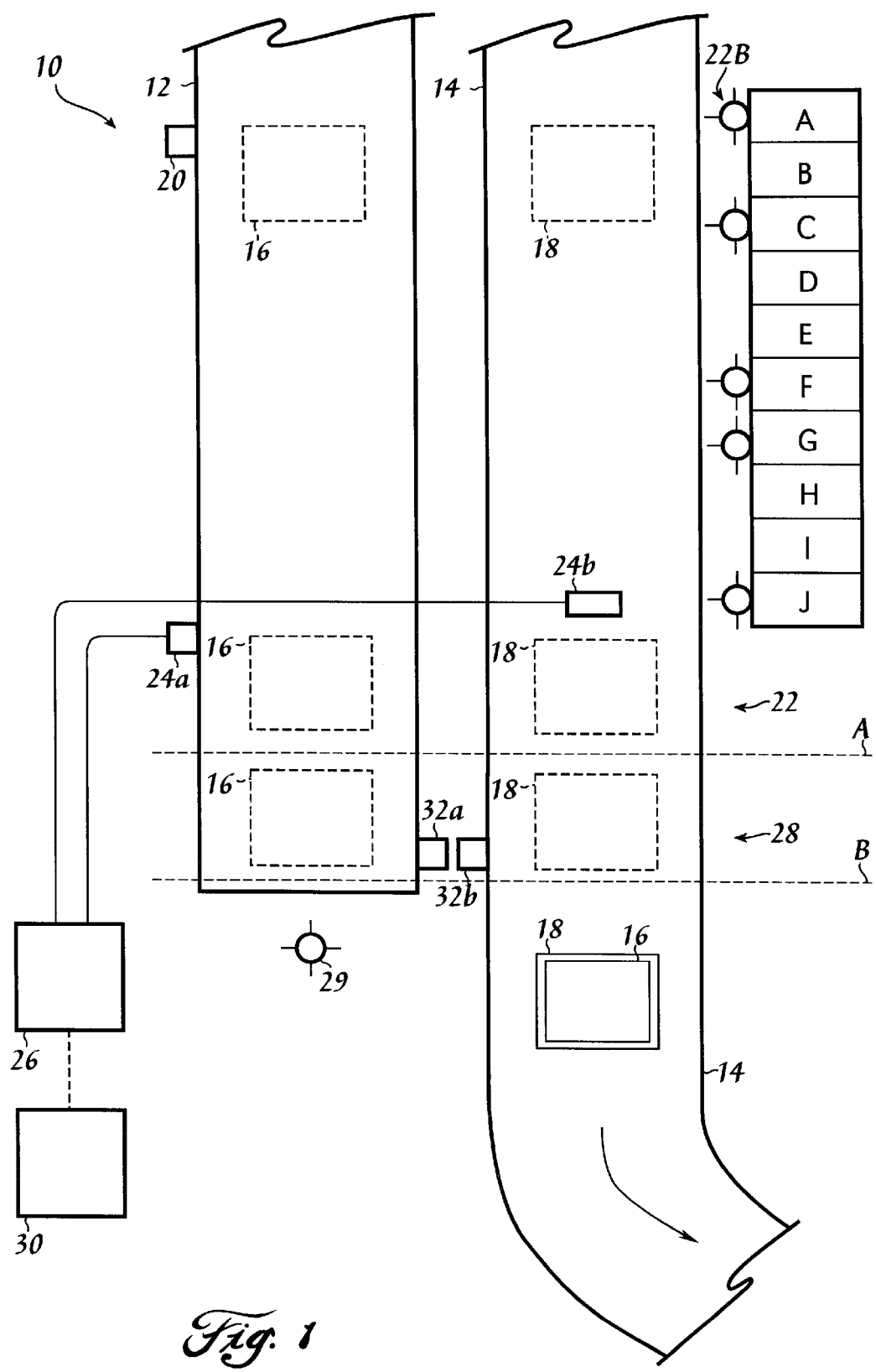
FIG. 1 is a diagrammatic plan view illustrating an embodiment of the conveyor system used with the consolidation station.

A conveyor system, FIG. 1, is generally designated 10 and includes a first conveyor 12 arranged in parallel with a second conveyor 14. First conveyor 12 conveys a computer chassis 16. The chassis 16 includes a label having a track code thereon. The track code is in a bar code form and is the lifetime identification (ID) for chassis 16. Second conveyor conveys a tote 18 for carrying components which are later assembled into the chassis 16 to complete a build-to-order computer system.

As chassis 16 moves past a scanner 20, adjacent first conveyor 12, scanner 20 reads the chassis label and a matching label is automatically produced and then manually placed on tote 18. In addition, a system activates indicators on a plurality of selected component bins such that an attendant can manually pick a component from each indicated bin and place the component in the tote. For example, a light 22B on each of the bins A, C, F, G and J, activated by scanner 20 reading the chassis 16 label, indicates to the attendant that a component from the indicated bins A, C, F, G and J, should be placed in tote 18. These components may include, for example, floppy drives, hard drives, cables, a modem, and all other hardware required to complete the hardware assembly. As a result, the chassis 16 and tote 18 are matched as they move along parallel conveyors 12 and 14, and the correct components are automatically identified and placed in the tote 18 for eventual assembly in chassis 16.

The chassis 16 and tote 18 continue to move along conveyors 12 and 14, respectively, to a scanning zone 22 and the conveyors 12 and 14 are stopped at a scanning zone position designated A, for example by a pneumatic brake, and the labels are read by scanners 24a and 24b. Scanners 24a and 24b transmit their label readings to a decoder box 26 where they are compared to see if the chassis 16 label and the tote 18 label match. If a "no match" is indicated by the decoder box 26, a light signal is given at 29 and an operator will manually remove the chassis 16 from the line. This is because the label on the tote 18 is produced from a chassis 16 label. Therefore, the tote 18 is always in the right conveyor position. Typically when this occurs, the next chassis 16 in sequence will match the tote 18. However, when a match occurs, there is an output from the decoder box 26 to a programmable logic controllers (PLC) 30, and the chassis 16 and the tote 18 are automatically released from the scanning zone 22 to a consolidation zone 28 where the chassis 16 and tote 18 are stopped at a position designated B. Two fiber optic sensors 32a and 32b provide a signal that the chassis 16 and tote 18 are in their properly aligned consolidation positions. The PLC 30 verifies that the next step is ready to be initiated.

Figure 2:
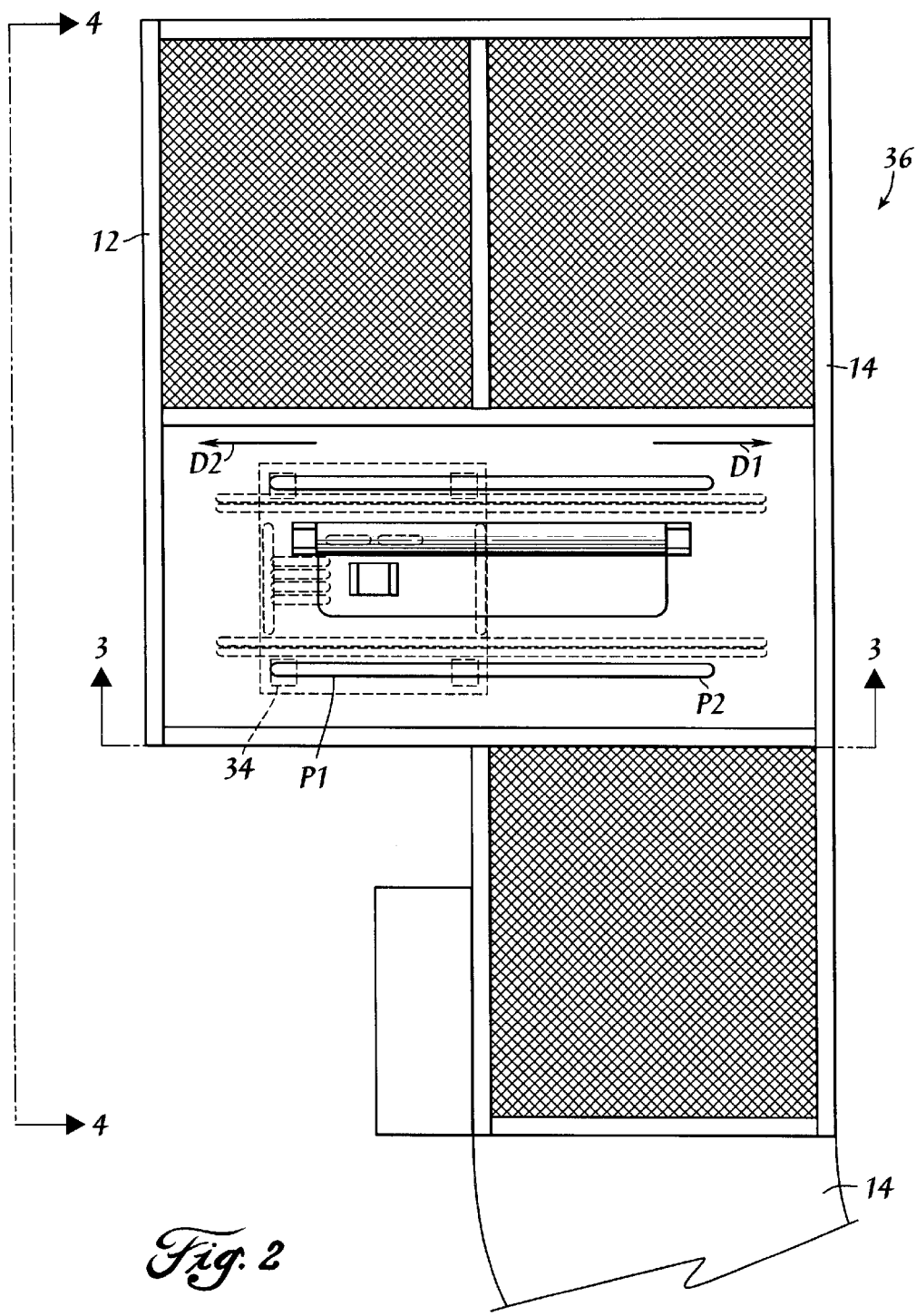
FIG. 2 is a plan view illustrating an embodiment of the consolidation station.
Figure 3:
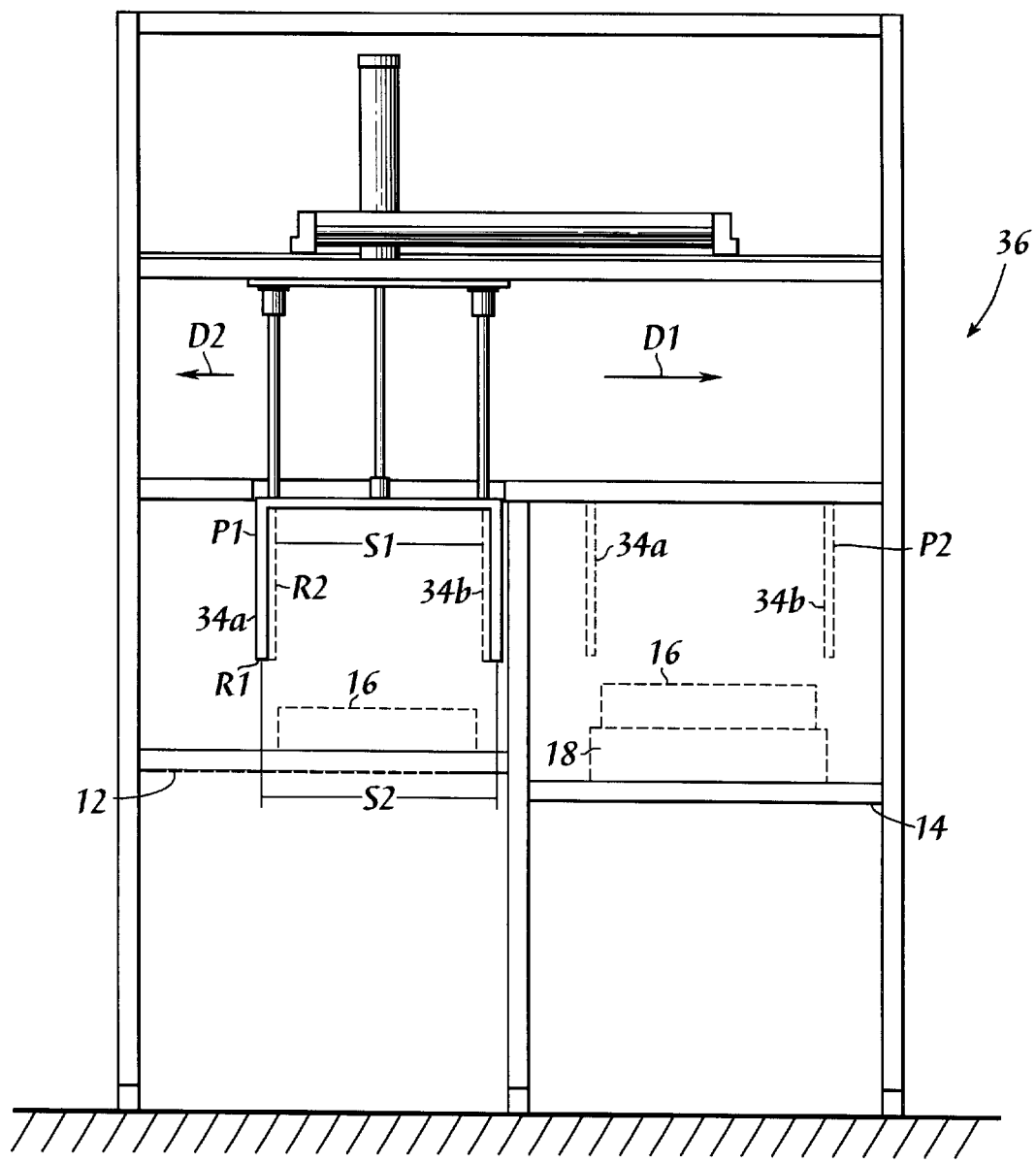
FIG. 3 is a frontal view of the consolidation station taken along the line 3—3 of FIG. 2.
Figure 4:
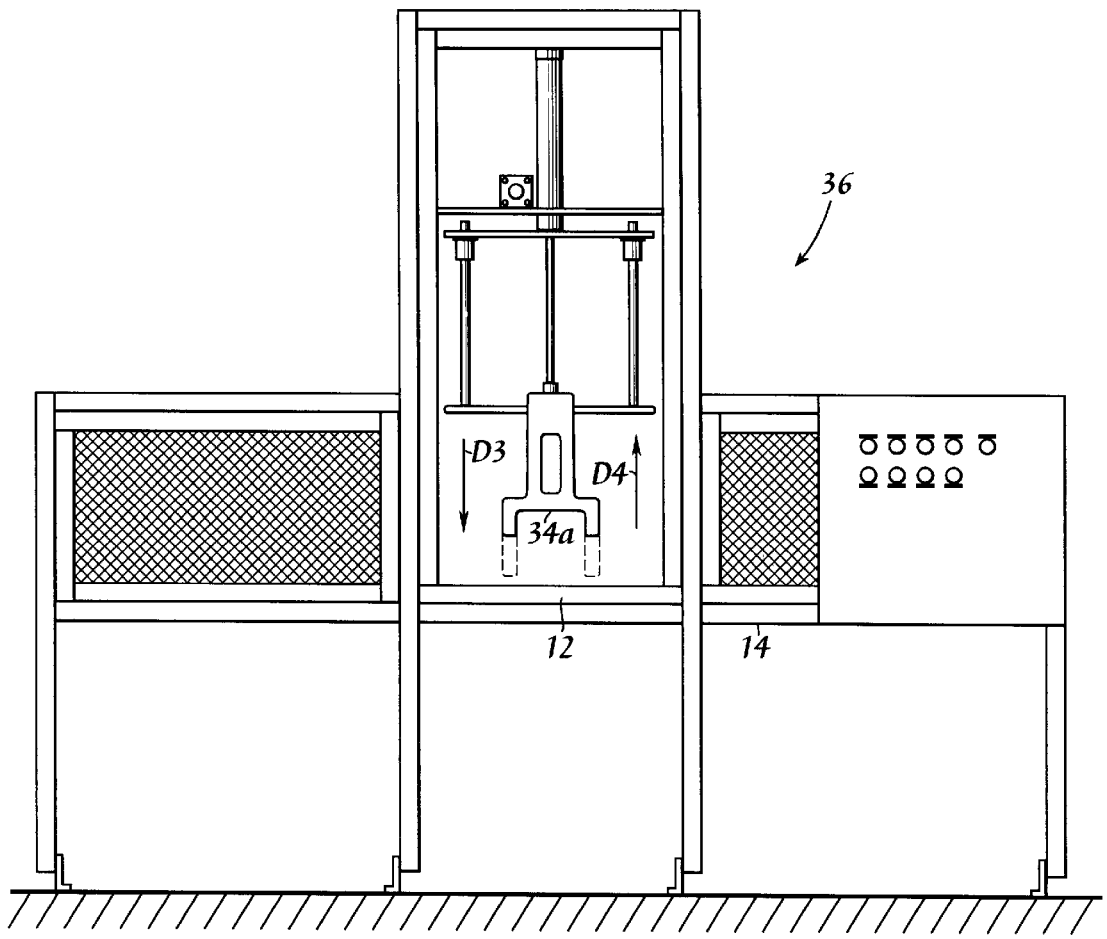
FIG. 4 is a side view of the consolidation station taken along the line 4—4 of FIG. 2.

At this point, a gripper 34, FIG. 2, movably supported in a consolidation station 36, is energized for transferring chassis 16 from conveyor 12 to the adjacent conveyor 14. Gripper 34 is an electronically controlled, solenoid actuated, pneumatic pick and place device. Gripper 34 is suspended and movably mounted in a first position P1, above first conveyor 12 to move in a direction designated D1, to a second position P2, above second conveyor 14, and to move in a direction designated D2, to return to position P1, see also FIG. 3. Gripper 34 includes a pair of spaced apart, solenoid actuated gripper arms 34a and 34b which are actuated to move from a release position R1 to a gripping position R2. In gripping position R2, arms 34a and 34b move toward each other to a spacing designated S1, and in release position R1, arms 34a and 34b move away from each other to a spacing designated S2, greater than S1. Also, gripper arms 34a and 34b, only one of which is illustrated in FIG. 4, are movable downwardly toward conveyors 12 and 14, in a direction designated D3, and upwardly away from conveyors 12 and 14, in a direction designated D4.

In this manner, the gripper 34, in starting position P1, is lowered in direction D3 toward conveyor 12, and the gripper arms 34a and 34b are moved from spacing S2 to S1 to grip chassis 16. Gripper 34 is raised in direction D4 to lift chassis 16 from conveyor 12. Gripper 34 is moved laterally in direction D1 to position P2 above conveyor 14, and then lowered in direction D3 to deposit chassis 16 on tote 18. Arms 34a and 34b are then moved to spacing S2 to release chassis 16. Gripper 34 is raised in direction D4 and moved laterally in direction D2 above conveyor 12 to the starting position P1. After the chassis 16 is deposited on the tote 18, both the chassis 16 and tote 18 move together on an extension of single conveyor 14 to an assembly station where the components are installed in chassis 16, see FIG. 1.

In operation, the chassis and the tote are released from the scanning zone after the track codes are read and a match condition occurs. The system scanner transmits the track code to the decoder box where it is compared with the tote track code label. If a match occurs the appropriate output to the PLC is energized. The system is then released into the consolidation zone. If a "no match" condition occurs a light is illuminated and the message "No Match" is displayed on the decoder to alert the operator that the chassis must be removed. The operator will open a door adjacent conveyor 12 and manually remove the chassis. The conveyor will automatically scan the next unit and check for a match.

Two fiber optic sensors are used to verify that chassis and tote are in the proper consolidation positions. The PLC verifies that all the mechanisms are in the proper starting positions prior to initiating the cycle. A solenoid to lower the gripper is activated first. Once the gripper arms are in the down position, the solenoid to close the gripper arms is activated. With the gripper arms closed, the solenoid to lower the grippers is deactivated. This allows the gripper to lift the chassis to begin the transfer operation. After the chassis has been raised the next chassis is released into the picking zone. A solenoid to transfer the chassis to the tote is now energized. A rodless cylinder moves the chassis from the chassis conveyor to the tote conveyor. The gripper is lowered again. In the lowered position, the gripper arms are opened upon the deactivation of the gripper solenoid. The gripper is raised back up and the consolidated system is released to the assembly area. The gripper mechanism is returned to the starting position ready for the next cycle.

As it can be seen, the principal advantages of these embodiments are that the automated consolidation station verifies a match between the tote and the chassis, moves the chassis to a position adjacent the tote on a single conveyor line, and forwards the chassis and tote to an assembly area. As a result, the headcount on each assembly line can be reduced by one operator. Thus, an operation having several assembly lines working simultaneously, for two shifts, can realize a substantial savings. Also, operator boredom and fatigue is eliminated for the reduced headcount positions.

As a result, one embodiment provides an automated consolidation station including a first conveyor for conveying a chassis including a first label and a second conveyor for conveying a tote including a second label matched to the first label. A pair of bar code readers are provided such that one reader reads the chassis label and the other reader reads the tote label. A decoder receives a signal from each reader and compares each signal. A gripper is energized by an output produced by a match indicated by each signal being compared. As a result, the chassis and tote are positioned together on a single one of the conveyors.

Another embodiment provides an automated consolidation station including a first code reader for reading a label on a chassis on a first conveyor and a second code reader for reading a label on a tote on a second conveyor. Means are provided for comparing a first signal generated from the first code reader and a second signal generated from the second code reader to determine if the first and second signals are matched. Other means receives an output from the comparing means in response to the first and second signals being matched. A device senses the position of the chassis and the tote, and further means positions the chassis and the tote on a single one of the conveyors.

A further embodiment provides a method of matching and consolidating a chassis and a tote on a computer assembly line. A computer chassis is moved along a first conveyor. A tote containing computer components is moved along a second conveyor adjacent the first conveyor. A label on the chassis is read with a first reader. A label on the tote is read with a second reader. A first signal from the first reader is compared with a second signal from the second reader. The first and second compared signals are verified for a match. The relative positions of the chassis and tote are then verified and the chassis and the tote are positioned on a single one of the conveyors.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automated consolidation station comprising:
    a first conveyor for conveying a chassis including a first label;
    a second conveyor for conveying a tote including a second label matched to the first label;
    a pair of bar code readers, one of the readers for reading the chassis label and the other of the readers for reading the tote label;
    a decoder connected to receive a signal from each reader and to compare each signal; and
    a gripper, energized by an output produced by a match indicated by each signal being compared, for positioning the chassis and the tote on a single one of the conveyors.

2. The consolidation station as defined in claim 1 wherein the chassis and the tote stop in a first position when the decoder is comparing the signal from each reader.

3. The consolidation station as defined in claim 2 wherein the chassis and the tote are released from the first position after the decoder compares each signal.

4. The consolidation station as defined in claim 3 wherein the chassis and the tote stop in a second position so that the gripper can position the chassis and tote on the single one of the conveyors.

5. The consolidation station as defined in claim 2 wherein the chassis and tote are not released from the first position in the event that no match is indicated, whereby the chassis is removed from the first conveyor.

6. The consolidation station as defined in claim 5 wherein the chassis is manually removed from the first conveyor.

7. The consolidation station as defined in claim 4 wherein the gripper positions the chassis on the second conveyor adjacent the tote.

8. The consolidation station as defined in claim 4 wherein the chassis and tote move on the single one of the conveyors to an assembly station.

9. The consolidation station as defined in claim 7 wherein the chassis and tote move on the second conveyor to an assembly station.

10. The consolidation station as defined in claim 1 wherein the gripper is movably mounted above the first conveyor.

11. The consolidation station as defined in claim 1 wherein the gripper is suspended above the first conveyor and is movable toward the first conveyor for gripping engagement with the chassis, and is movable for lifting the chassis from the first conveyor and for laterally moving the chassis to be released onto the second conveyor adjacent the tote.

12. The consolidation station as defined in claim 1 wherein the gripper is suspended above the first conveyor and is movable laterally between the first conveyor and the second conveyor.

13. The consolidation station as defined in claim 1 wherein the gripper is suspended above the first conveyor and is movable for gripping the chassis, for lifting the chassis from the first conveyor, for laterally moving the chassis from the first conveyor to the second conveyor, and for depositioning and releasing the chassis onto the second conveyor.

14. An automated consolidation station comprising:
    a first code reader for reading a label on a chassis on a first conveyor;

a second code reader for reading a label on a tote on a second conveyor;

means for comparing a first signal generated from the first code reader and a second signal generated from the second code reader to determine if the first and second signals are matched;

means for receiving an output from the means for comparing in response to the first and second signals being matched;

means for sensing the position of the chassis and the tote; and means for positioning the chassis and the tote on a single one of the conveyors.

15. A method of matching and consolidating a chassis and a tote on a computer assembly line comprising the steps of:

conveying a computer chassis on a first conveyor;

conveying a tote containing computer components on a second conveyor adjacent the first conveyor;

reading a label on the chassis with a first reader;

reading a matching label on the tote with a second reader;

comparing a first signal from the first reader and a second signal from the second reader;

verifying that the first and second signals are matched;

sensing the relative positions of the chassis and the tote; and positioning the chassis and the tote on a single one of the conveyors.

16. The method as defined in claim 15 wherein the step of positioning includes the steps of lifting the chassis from the first conveyor and depositing the chassis on the tote.

17. The method as defined in claim 15 wherein the step of positioning includes the step of moving the chassis and the tote together to an assembly station.

18. The method as defined in claim 15 wherein the step of positioning includes the step of gripping the chassis and laterally moving the chassis from the first conveyor to the second conveyor.

19. The method as defined in claim 15 wherein the step of comparing includes the step of stopping the chassis and the tote in a first position.

20. The method as defined in claim 19 wherein the step of sensing the relative positions of the chassis and the tote includes the step of stopping the chassis and the tote in a second position.

* * * * *